US006681153B1

(12) United States Patent
Horn et al.

(10) Patent No.: US 6,681,153 B1
(45) Date of Patent: Jan. 20, 2004

(54) AUTOMATED, INTERACTIVE DATA COLLECTION, DATA TRANSMITTAL AND DATA ASSESSMENT METHOD

(75) Inventors: Ronald Martin Horn, Palo Alto, CA (US); Samson Hettiarachchi, Menlo Park, CA (US); James Maclain Huff, Boulder Creek, CA (US); Jenny Y. Mui, San Jose, CA (US)

(73) Assignee: General Electric Company, Schenectady, NY (US)

( * ) Notice: Subject to any disclaimer, the term of this patent is extended or adjusted under 35 U.S.C. 154(b) by 178 days.

(21) Appl. No.: 09/631,373

(22) Filed: Aug. 2, 2000

(51) Int. Cl.[7] .................... G05B 15/00; G05B 11/01; G05B 21/00; G01N 33/20
(52) U.S. Cl. ..................... 700/286; 700/1; 700/22; 700/266; 436/73
(58) Field of Search ................. 700/1, 266, 22, 700/286; 702/23; 376/245; 340/450; 210/696; 436/73

(56) References Cited

U.S. PATENT DOCUMENTS

| | | | |
|---|---|---|---|
| 5,126,729 A | * 6/1992 | McKinney et al. ......... 340/450 |
| 5,448,605 A | 9/1995 | Hettiarachchi |
| 5,504,692 A | * 4/1996 | Cardner ..................... 700/266 |
| 5,521,814 A | * 5/1996 | Teran et al. ................ 700/266 |
| 5,590,051 A | * 12/1996 | Yokozawa .................. 700/266 |
| 5,600,691 A | 2/1997 | Hettiarachchi et al. |
| 5,600,692 A | 2/1997 | Hettiarachchi |
| 5,602,888 A | 2/1997 | Hettiarachchi et al. |
| 5,608,766 A | 3/1997 | Andresen et al. |
| 5,625,656 A | * 4/1997 | Hettiarachchi et al. ..... 376/245 |
| 5,719,911 A | 2/1998 | Hettiarachchi et al. |
| 5,724,254 A | 3/1998 | Millett et al. |
| 5,768,330 A | 6/1998 | Andresen et al. |
| 5,773,096 A | 6/1998 | Hettiarachchi et al. |
| 5,805,653 A | * 9/1998 | Hettiarachchi et al. ..... 376/305 |
| 5,832,411 A | * 11/1998 | Schatzmann et al. ......... 702/23 |
| 5,855,791 A | * 1/1999 | Hays et al. ................. 210/696 |
| 5,966,683 A | 10/1999 | Millett et al. |

* cited by examiner

Primary Examiner—Jill Warden
Assistant Examiner—Brian Sines
(74) Attorney, Agent, or Firm—Nixon & Vanderhye P.C.

(57) ABSTRACT

A method of monitoring process parameters and process effectiveness over a global network enables multiple processing sites to utilize globally compiled field data to determine process parameters and the like. Application parameters are received from multiple processing sites over the global network, and post-application data is received from the multiple processing sites at preset time intervals. The application parameters and the post-application data are analyzed to determine analytical models for future application parameters, which are accessible by system users via the global network.

16 Claims, 5 Drawing Sheets

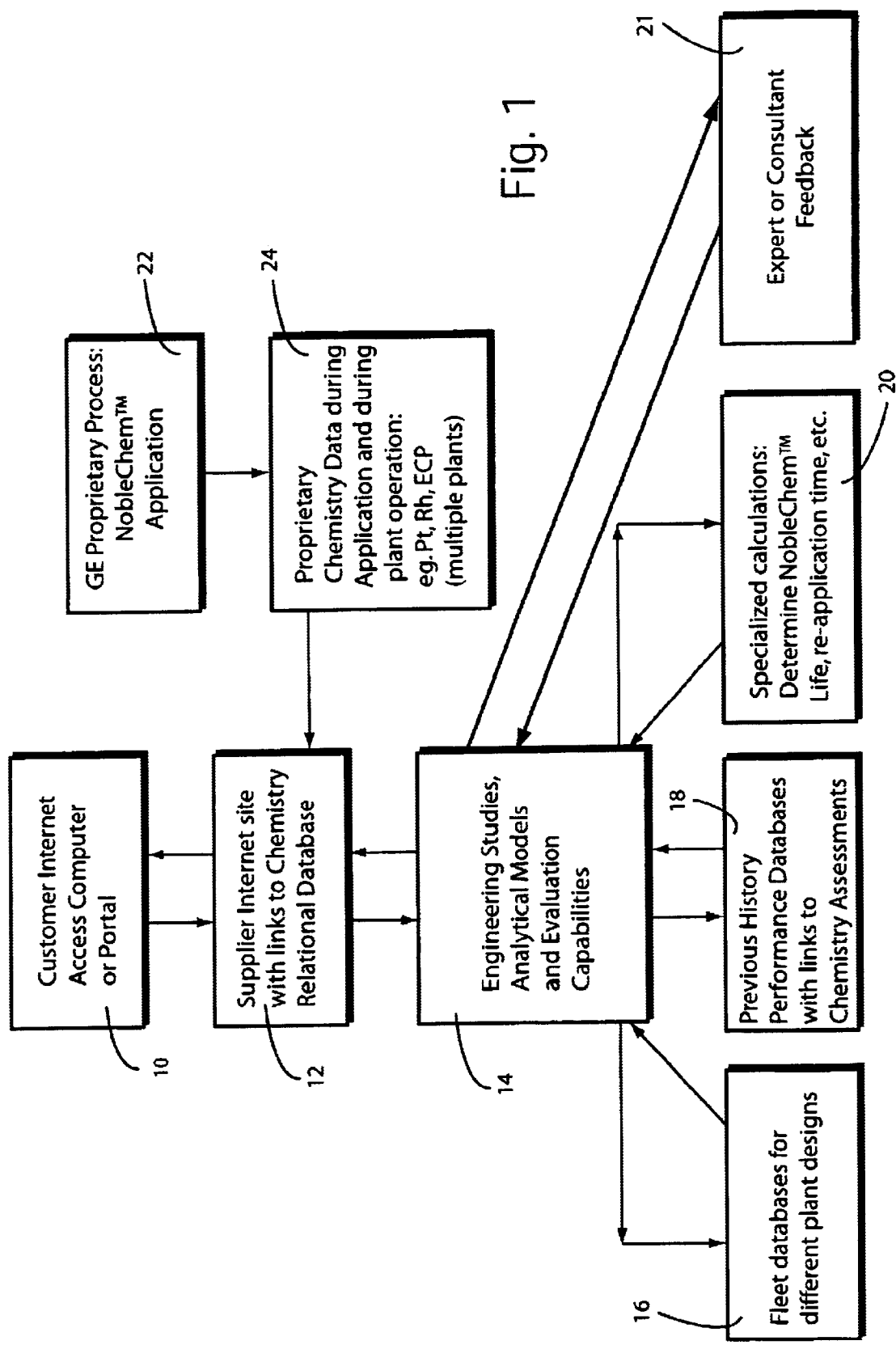

Fig. 2a

AUTOMATED, INTERACTIVE DATA COLLECTION, DATA TRANSMITTAL AND DATA ASSESSMENT METHOD

BACKGROUND OF THE INVENTION

This invention relates to monitoring process parameters and process effectiveness using data from multiple processing sites and, more particularly, to monitoring process parameters and process effectiveness for the application of noble metals to surfaces in nuclear reactors.

In order to enhance the performance of and increase the effective useful life of a boiling water nuclear reactor, it is desirable to treat interior reactor surfaces using various concentrations and compounds including noble metals. The noble metal application in combination with hydrogen serves to remove oxidizing species in water that lead to stress corrosion, catalyze reactions, and the like. An example of the noble metal chemical application process is described in U.S. Pat. Nos. 5,448,605; 5,602,888; 5,600,692; 5,608,766; 5,625,656; 5,600,691; 5,719,911; 5,768,330 and 5,773,096, the entire contents of which are hereby incorporated by reference.

It is desirable to minimize reactor shut down time, and thus, it is important to determine an appropriate application or re-application time to minimize reactor shut down time or critical path time. Various parameters are analyzed to determine variations in the application process as well as the timing for any re-application. It is desirable to use comparable data to determine process parameters as well as application timing and the like as it can be reasonably concluded that most applications will react similarly.

Current methods for performing analysis of application parameters and post-application data require transmittal of data and engineering reports, which are generated manually and/or in batch form. As a consequence, it becomes time consuming and inefficient to generate interactive assessments. Moreover, this procedure restricts the ability to perform past and future assessments in a single time span. Still further, access and use of the data is restricted to a limited number of specialists. Accurate assessments require the use of different inputs requiring outputs from different sources and/or requiring work by specialists of another discipline. As a consequence, a current user or party seeking to maximize application time and effectiveness may not be able to best understand the current status for preferred method of noble metal application. The users are also unable to compare performance with other plants or other time frames.

BRIEF SUMMARY OF THE INVENTION

In an exemplary embodiment of the invention, a method of monitoring process parameters and process effectiveness over a global network includes (a) receiving application parameters from multiple processing sites over the global network, (b) receiving post-application data from the multiple processing sites at preset time intervals, (c) analyzing the application parameters and the post-application data to determine analytical models for future application parameters, and (d) enabling access to the analytical models and data via the global network. The analyzing step may include updating previous analytical models in accordance with the application parameters and the post-application data received from the multiple processing sites. The post-application data can be received over the global network or may be received by sampling physical materials from the multiple processing sites, or both. The data can also be received in real time for remote monitoring. The application parameters and the post-application data are preferably separated by site type, wherein application timing based on the application parameters and the post-application data is determined by site type.

In one embodiment, the application parameters and the post-application data relate to an application of noble metals in a boiling water nuclear reactor. In this context, the application parameters received include at least one of timing of chemical application, materials for chemical application, and method of chemical application. In this context, the post-application data relates to an existence of metals on protected boiling water nuclear reactor surfaces over time. The method may also include the step of enabling access to data archives of the application parameters and the post-application data. Still further, step (c) may be practiced in real time for consulting.

In another exemplary embodiment of the invention, a computer system for monitoring process parameters and process effectiveness includes at least one user computer running a computer program that effects entry of application parameters and post-application data for multiple processing sites. A system server runs a server program, wherein the user computer and the system server are interconnected by a computer network. The system server analyzes the application parameters and the post-application data according to the server program to determine analytical models for future application parameters. The server also enables access to the analytical models.

In another exemplary embodiment of the invention, a computer program embodied on a computer readable medium is provided for monitoring process parameters and process effectiveness over a global network.

BRIEF DESCRIPTION OF THE DRAWINGS

FIG. 1 is a process schematic of the interactive system architecture;

FIGS. 2a–2c are exemplary screen shots showing sample data and calculated parameters.

DETAILED DESCRIPTION OF THE INVENTION

Figure 2A:
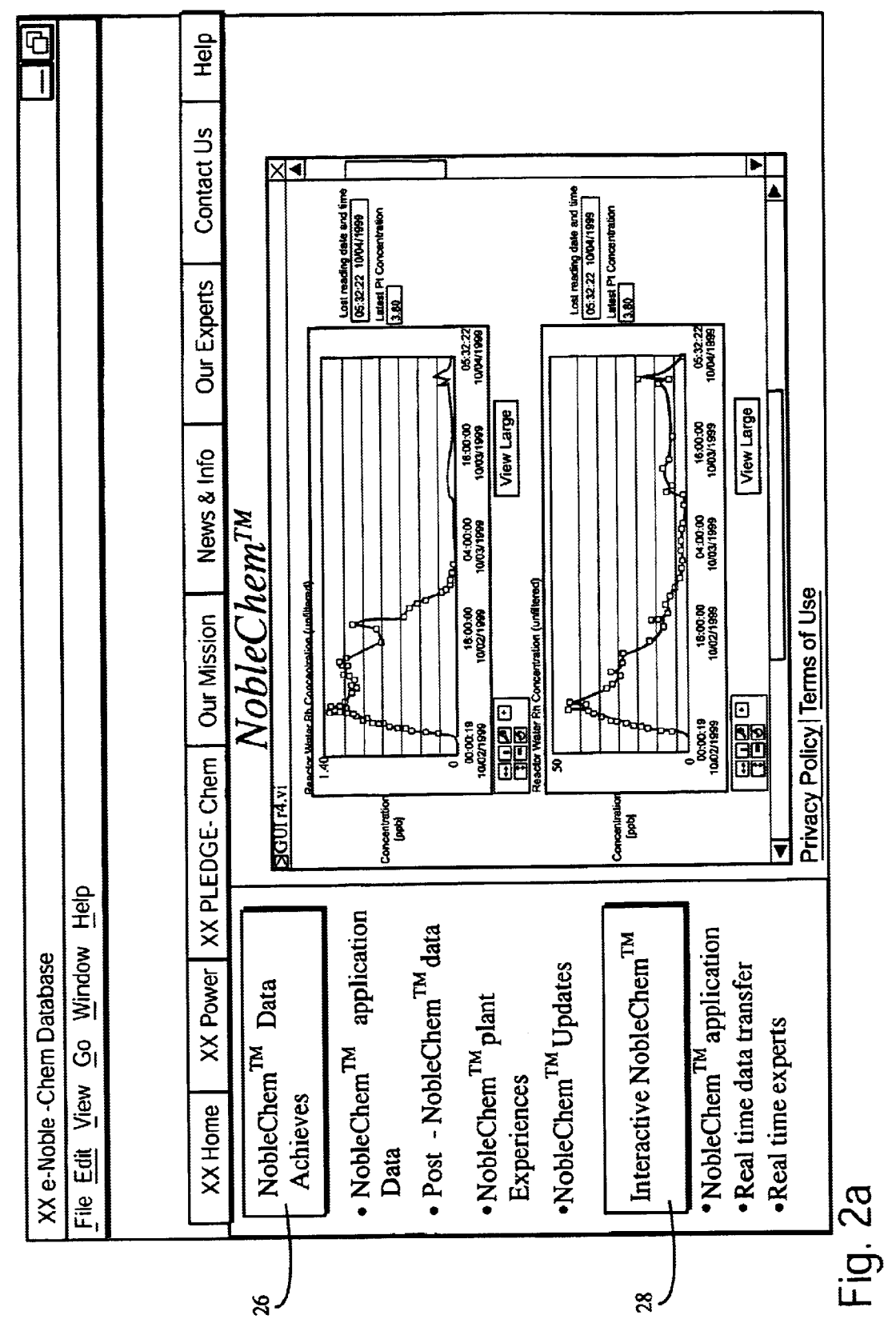
Figure 2B:
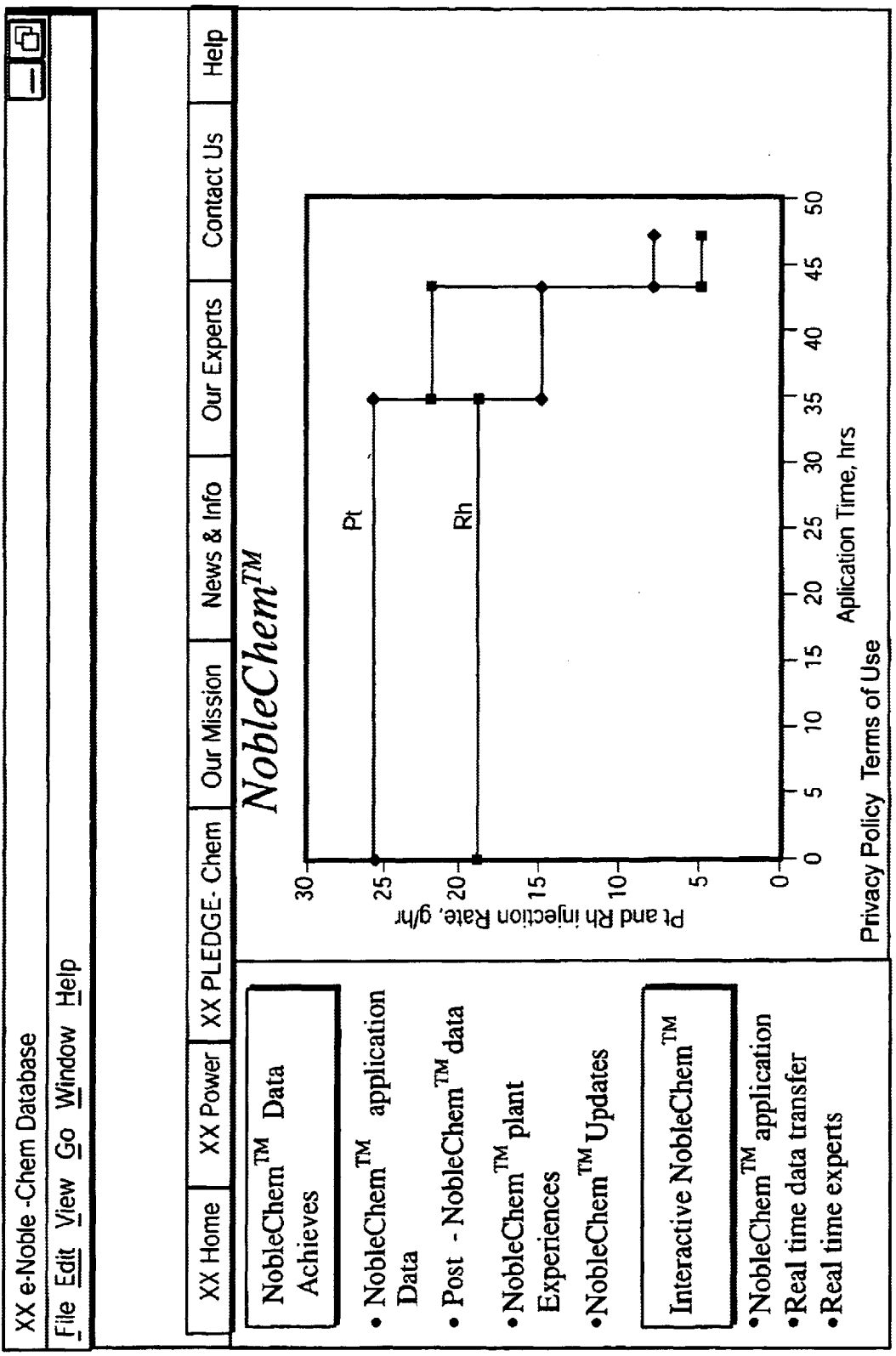

The monitoring system implemented in the diagrams of FIGS. 1 and 2 is preferably a browser-based system in which a program running on a user's computer (the user's web browser) requests information from a server program running on a system server. The system server sends the requested data back to the browser program and the browser program then interprets and displays the data on the user's computer screen. The process is as follows:

1. The user runs a web browser program on his/her computer.
2. The user connects to the server computer (e.g., via the Internet). Connection to the server computer may be conditioned upon the correct entry of a password as is well known.
3. The user requests a page from the server computer. The user's browser sends a message to the server computer that includes the following:
   the transfer protocol (e.g., http://); and
   the address, or Uniform Resource Locator (URL).
4. The server computer receives the user's request and retrieves the requested page, which is composed, for example, in HTML (Hypertext Markup Language).

5. The server then transmits the requested page to the user's computer.
6. The user's browser program receives the HTML text and displays its interpretation of the requested page.

Thus, the browser program on the user's computer sends requests and receives the data needed to display the HTML page on the user's computer screen. This includes the HTML file itself plus any graphic, sound and/or video files mentioned in it. Once the data is retrieved, the browser formats the data and displays the data on the user's computer screen. Helper applications, plug-ins, and enhancements such as Java™ enable the browser, among other things, to play sound and/or display video inserted in the HTML file. The fonts installed on the user's computer and the display preferences in the browser used by the user determine how the text is formatted.

If the user has requested an action that requires running a program (e.g., a search), the server loads and runs the program. This process usually creates a custom HTML page "on the fly" that contains the results of the program's action (e.g., the search results), and then sends those results back to the browser.

Browser programs suitable for use in connection with the monitoring system of the present invention include Netscape® Navigator available from Netscape® Communications Corporation and Internet Explorer available from Microsoft® Corp.

While the above description contemplates that each user has a computer running a web browser, it will be appreciated that more than one user could use a particular computer terminal or that a "kiosk" at a central location with access to the system server could be provided.

It will be recognized by those in the art that various tools are readily available to create web pages for accessing data stored on a server and that such tools may be used to develop and implement the monitoring system described below and illustrated in the accompanying drawings.

Figure 3:
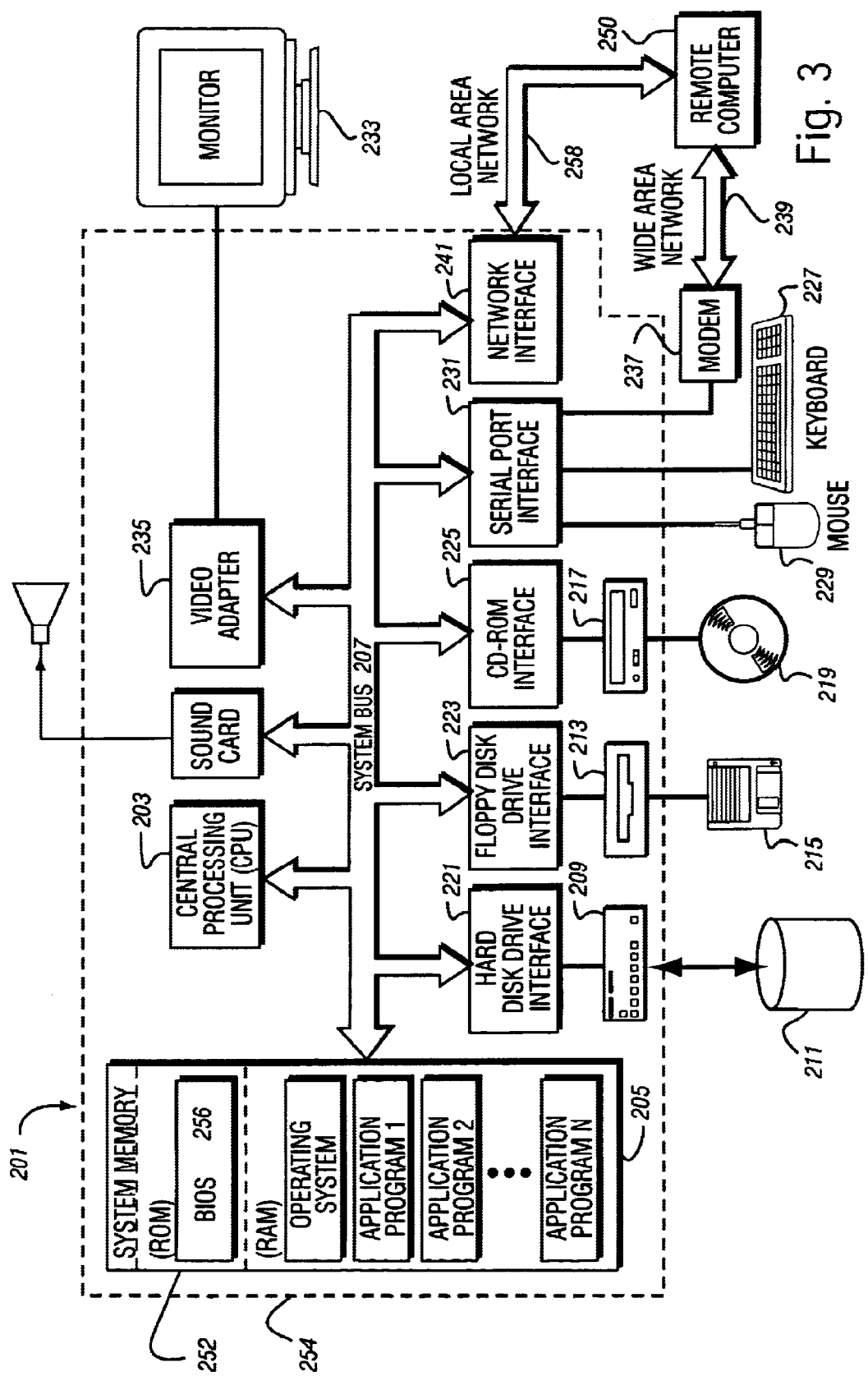
FIG. 3 is a block diagram illustrating the components of a computer.

FIG. 3 generally illustrates a computer system 201 suitable for use as the client and server components of the monitoring system. It will be appreciated that the client and server computers will run appropriate software and that the client and server computers may be somewhat differently configured with respect to the processing power of their respective processors and with respect to the amount of memory used. Computer system 201 includes a processing unit 203 and a system memory 205. A system bus 207 couples various system components including system memory 205 to processing unit 203. System bus 207 may be any of several types of bus structures including a memory bus or memory controller, a peripheral bus, and a local bus using any of a variety of bus architectures. System memory 205 includes read only memory (ROM) 252 and random access memory (RAM) 254. A basic input/output system (BIOS) 256, containing the basic routines that help to transfer information between elements within computer system 201, such as during start-up, is stored in ROM 252. Computer system 201 further includes various drives and associated computer-readable media. A hard disk drive 209 reads from and writes to a (typically fixed) magnetic hard disk 211; a magnetic disk drive 213 reads from and writes to a removable "floppy" or other magnetic disk 215; and an optical disk drive 217 reads from and, in some configurations, writes to a removable optical disk 219 such as a CD ROM or other optical media. Hard disk drive 209, magnetic disk drive 213, and optical disk drive 217 are connected to system bus 207 by a hard disk drive interface 221, a magnetic disk drive interface 223, and an optical drive interface 225, respectively. The drives and their associated computer-readable media provide nonvolatile storage of computer-readable instructions, SQL-based procedures, data structures, program modules, and other data for computer system 201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules may be stored on the hard disk 211, removable magnetic disk 215, optical disk 219 and/or ROM 252 and/or RAM 254 of the system memory 205. Such program modules may include an operating system providing graphics and sound APIs, one or more application programs, other program modules, and program data. A user may enter commands and information into computer system 201 through input devices such as a keyboard 227 and a pointing device 229. Other input devices may include a microphone, joystick, game controller, satellite dish, scanner, or the like. These and other input devices are often connected to the processing unit 203 through a serial port interface 231 that is coupled to the system bus 207, but may be connected by other interfaces, such as a parallel port interface or a universal serial bus (USB). A monitor 233 or other type of display device is also connected to system bus 207 via an interface, such as a video adapter 235.

The computer system 201 may also include a modem 237 or other means for establishing communications over the wide area network 239, such as the Internet. The modem 237, which may be internal or external, is connected to the system bus 207 via the serial port interface 231. A network interface 241 may also be provided for allowing the computer system 201 to communicate with a remote computing device 250 via a local area network 258 (or such communication may be via the wide area network 239 or other communications path such as dial-up or other communications means). The computer system 201 will typically include other peripheral output devices, such as printers and other standard peripheral devices.

As will be understood by those familiar with web-based forms and screens, users may make menu selections by pointing-and-clicking using a mouse, trackball or other pointing device, or by using the TAB and ENTER keys on a keyboard. For example, menu selections may be highlighted by positioning the cursor on the selections using a mouse or by using the TAB key. The mouse may be left-clicked to select the selection or the ENTER key may be pressed. Other selection mechanisms including voice-recognition systems, touch-sensitive screens, etc. may be used and the invention is not limited in this respect.

With reference to FIGS. 1 and 2, the present invention will be described in the context of an application/installation of noble metals to interior surfaces of a boiling water nuclear reactor. This application, however, is exemplary, and the invention is applicable to any application for globally compiled field data to determine application process parameters and the like. The application is thus not necessarily meant to be limited to the specifically described application.

During shutdown of a nuclear reactor, it is desirable to apply noble metals to interior surfaces of the reactor, as described in the U.S. Patents noted above. Such applications serve to catalyze reactions, remove oxidizing species that lead to stress corrosion, and the like. With the system of the present invention, users can access a server database that stores information relating to application parameters and post-application data. The users can utilize this data and/or analytical models derived from the data to more efficiently effect their own processes and maximize the application benefit through proper application timing.

FIG. 1 is a flow schematic of the system of the present invention. A user or customer accesses a supplier Internet site 12 or like information source via a global network such as the Internet with an access computer or portal 10. Through the Internet site 12, the user can access links 14 to engineering studies, analytical models and evaluation capabilities. The specific studies, models and evaluation capabilities are generated from application parameters that are received from multiple processing sites over the global network as well as post-application data from the multiple processing sites at preset time intervals. Since the present application is more generally directed to monitoring process parameters and effectiveness using globally compiled field data, the specific studies, models and evaluation capabilities will not be further described. In the present example relating to processing parameters for noble metal application in nuclear reactors, the application parameters and the post-application data are separated by site type for different plant designs at a link 16. Previous history performance databases with links to chemistry assessments and the like can be accessed at a link 18, and specialized calculations to determine the noble metal application life, re-application time and the like can be accessed via a link 20. Expert or consultant feedback for advice, analysis or the like can be accessed via a link 21. Users can thus access globally compiled field data from other users that is organized, analyzed, or otherwise processed via the supplier or server site 12. In a similar context, the link areas 16, 18, 20, 21 include provisions such as drop-down menus and the like to effect user entry of data relating to the user's application parameters and post-application data.

In the presently described exemplary application, information concerning the noble metal application process can be accessed via a link 22, and more specific chemistry data during application and plant operation can be accessed via a link 24. Such data may include, for example, testing and/or sampling for the existence of platinum (Pt), rhodium (Rh), temperature, noble metal injection rates, noble metal loading data, concentration of ionic species, conductivity, pH and tests for electrochemical potential (ECP), which is particularly useful for determining transient behavior of the noble metals after application. As noted, the data can be used not only to modify the application process but also monitor the reactor surfaces to determine an appropriate re-application time. The post-application data can be received from the users via the links 16, 18, 20 using on-site testing materials and systems and the like. Alternatively or additionally, the server or supplier may receive and sample physical materials from the multiple processing sites for supplier-side chemical analyses. Such data input via the link 24 is beneficial for the engineering studies, analytical models and evaluation capabilities at link 14.

Figure 2C:
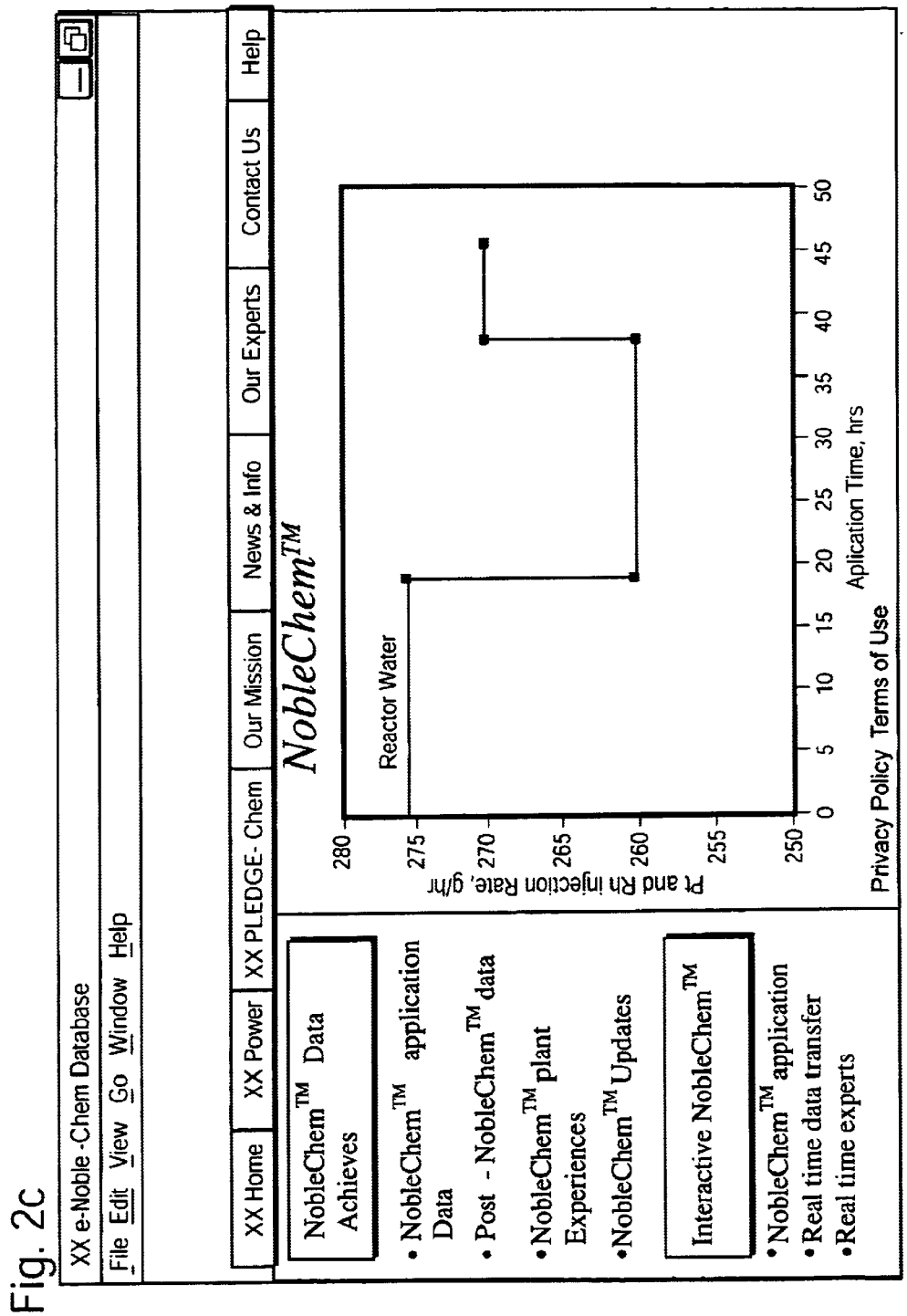

FIGS. 2*a*, 2*b* and 2*c* are exemplary screen shots showing links to available information and information input areas as well as sample output graphs showing ion concentration over time for various materials (FIG. 2*a*), showing the variation in injection rate with time (FIG. 2*b*) and showing the temperature changes with time during the injection process (FIG. 2*c*). The figures illustrate the use of a global network to monitor rapid process changes. In the data archives section 26, the users can view archived application parameters and data, post-application data from multiple processing sites, plant experience information and recent updates to the application process, analytical models and the like. Through an interactive link at 28, users can download and input data relating to the noble metal application. Additionally, the users are provided access to real time experts (via the link 21) that can provide instant review and analysis of field data. The experts can advise to change the temperature or change injection parameters to improve the process. This is important since the entire application process is completed in about 48 hours. In addition, if multiple applications are in progress, acquired information from one plant can be rapidly disseminated to other plants. On-line real time remote monitoring can be effected to keep track of the process, which is particularly useful for additions of other metals, such as zinc, chromium, nickel, titanium, zirconium, vanadium, tungsten, tin, magnesium, aluminum, molybdenum, tantalum.

With the system of the present invention, users can set up automated processes to collect proprietary data without compromising the data to other organizations. Once set up, the system can be operated and processes can be performed without human intervention or with minimum human intervention. The data can be compiled automatically and used for automated analyses that employ statistical tools or recurring algorithms. Using a global network such as the Internet, transmission and evaluation of data is made easy. Moreover, the Internet enables access to and input from a much larger set of potential users. Still further, the system allows the users to make multiple evaluations with ease, which are beneficial in decision making and planning. The system gives users the ability to maintain records of previous evaluations for future reference and allows the users to keep up-to-date databases and up-to-date predictions. Finally, the system allows the users to improve the quality of the analysis as it uses inputs from databases or applicable complementary assessments from other time periods or other plants for inputs with minimum or without human intervention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of monitoring process parameters and process effectiveness over a global network, the method comprising:
   (a) receiving installation parameters from multiple processing sites over the global network;
   (b) receiving post-installation data from the multiple processing sites at preset time intervals;
   (c) analyzing the installation parameters and the post-installation data to determine analytical models for future installation parameters; and
   (d) enabling access to the analytical models and the post-installation data via the global network,
   wherein the installation parameters and the post-installation data relate to an application of metals in a nuclear reactor and associated power generating components, and wherein step (a) is practiced by receiving parameters including at least one of timing of chemical application, materials for chemical application, and method of chemical application.

2. A method according to claim 1, wherein step (c) is practiced by updating previous analytical models in accordance with the installation parameters and the post-installation data received from the multiple processing sites.

3. A method according to claim 1, wherein step (b) is practiced by receiving the post-installation data over the global network.

4. A method according to claim 1, wherein step (b) is practiced by sampling physical materials from the multiple processing sites.

5. A method according to claim 4, wherein step (b) is further practiced in real time for remote monitoring.

6. A method according to claim 1, wherein step (c) is practiced by separating the installation parameters and the post-installation data by site type.

7. A method according to claim 6, wherein step (c) is further practiced by determining installation timing based on the installation parameters and the post-installation data by site type.

8. A method according to claim 1, wherein the installation parameters and the post-installation data relate to an application of noble metals in a nuclear reactor and associated power generating components.

9. A method according to claim 8, wherein step (b) is practiced by receiving data relating to an existence of added metals on nuclear reactor surfaces over time.

10. A method according to claim 9, wherein step (b) is further practiced in real time for remote monitoring.

11. A method according to claim 10, wherein real time monitoring is practiced for other metals added to the nuclear reactor.

12. A method according to claim 1, further comprising enabling access to data archives of the installation parameters and the post-installation data.

13. A method according to claim 1, wherein step (c) is practiced in real time for consulting.

14. A method of processing noble metal application in a nuclear reactor and associated power generating components, the method comprising accessing analytical models determined according to a method of monitoring process parameters and process effectiveness over a global network, the monitoring method comprising:

(a) receiving installation parameters from multiple processing sites over the global network;

(b) receiving post-installation data from the multiple processing sites at preset time intervals;

(c) analyzing the installation parameters and the post-installation data to determine analytical models for future installation parameters; and (d) enabling access to the analytical models and the post-installation data via the global network.

15. A computer system for monitoring process parameters and process effectiveness, the computer system comprising:

at least one user computer running a computer program that effects entry of installation parameters and post-installation data from multiple processing sites; and a system server running a server program, the at least one user computer and the system server being interconnected by a computer network, the system server analyzing the installation parameters and the post-installation data according to the server program to determine analytical models for future installation parameters, and enabling access to the analytical models, wherein the installation parameters and the post-installation data relate to an application of metals in a nuclear reactor and associated power generating components, and wherein the installation parameters including at least one of timing of chemical application, materials for chemical application, and method of chemical application.

16. A computer program embodied on a computer readable medium for monitoring process parameters and process effectiveness over a global network, the computer program comprising:

means for receiving installation parameters from multiple processing sites over the global network;

means for receiving post-installation data from the multiple processing sites at preset time intervals;

means for analyzing the installation parameters and the post-installation data to determine analytical models for future installation parameters; and means for enabling access to the analytical models via the global network, wherein the installation parameters and the post-installation data relate to an application of metals in a nuclear reactor and associated power generating components, and wherein step (a) is practiced by receiving parameters including at least one of timing of chemical application, materials for chemical application, and method of chemical application.

* * * * *